United States Patent [19]

Lannuzel

[11] Patent Number: 4,975,819
[45] Date of Patent: Dec. 4, 1990

[54] CUK TYPE DIRECT/DIRECT VOLTAGE CONVERTER AND MAINS SUPPLY WITH DIRECT CONVERSION ACHIEVED WITH A CONVERTER SUCH AS THIS

[75] Inventor: Roger Lannuzel, St. Denis, France

[73] Assignee: Thomson-CSF, Puteaux, France

[21] Appl. No.: 385,109

[22] Filed: Jul. 26, 1989

[30] Foreign Application Priority Data

Jul. 29, 1988 [FR] France ................ 88 10260

[51] Int. Cl.$^5$ ........................................ H02M 3/335
[52] U.S. Cl. ......................................... 363/16; 363/97; 323/222
[58] Field of Search ............... 363/16, 95, 97, 131; 323/222, 265

[56] References Cited

U.S. PATENT DOCUMENTS

| | | | |
|---|---|---|---|
| 4,184,197 | 1/1980 | Cuk et al. | 363/16 |
| 4,186,437 | 1/1980 | Cuk | 363/16 X |
| 4,257,087 | 3/1981 | Cuk | 363/16 |
| 4,262,328 | 4/1981 | Bloom et al. | 363/16 |
| 4,355,352 | 10/1982 | Bloom et al. | 363/16 |
| 4,734,839 | 3/1988 | Barthold | 363/16 |
| 4,868,730 | 9/1989 | Ward | 363/16 X |

FOREIGN PATENT DOCUMENTS 1454422 8/1966 France .
2570898 3/1986 France .

OTHER PUBLICATIONS

"A New Zero-Ripple Switching DC to DC Converter and Integrated Magnetics", Proceedings IEEE Power Electronics Specialists Conf., Jun. 1980, pp. 485-496.
"Coupled-Inductor and Integrated Magnetics Techniques in Power Electronics", Proceedings of Ittellec 83, Oct. 1983, pp. 347-353.

Primary Examiner—Steven L. Stephan
Assistant Examiner—Emanuel Todd Voeltz
Attorney, Agent, or Firm—Oblon, Spivak, McClelland, Maier & Neustadt

[57] ABSTRACT

A Cuk-type direct/direct or DC/DC voltage converter which is comprised of primary and secondary sides. These primary and secondary sides both contain a series circuit which is a made up of an inductance coil, a capacitor and a winding. The primary side also contains an active switch-over element and the secondary side contains a passive switch-over device. A control circuit delivers control pulses to the active switch-over element that are variable in width based on a function of an error signal. This control circuit comprises a slopes generator and a comparator which compares the instantaneous level of the slopes with a threshold level as a function of the error signal. The gradient of each slope varies as a function of the input voltage and is independent of the output voltage. The threshold level is a function of the error signal. The gradient of the slopes generator is controlled by a control voltage tapped at the mid point of a divider bridge which is series mounted wiuth a voltage reference. The divider bridge-voltage reference set has applied thereto a voltage which is equal to or proportionate to the input voltage. The outpout voltage produced by the converter under the control of the control circuit is made essentially independent of the input voltage. This open loop regulation provides for stability of the system, and thereby provides a response time which is below that of standard Cuk converters.

4 Claims, 3 Drawing Sheets

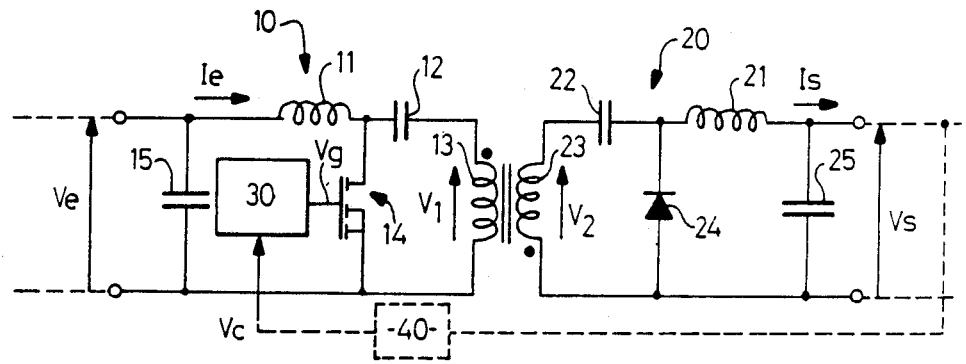
FIG_1
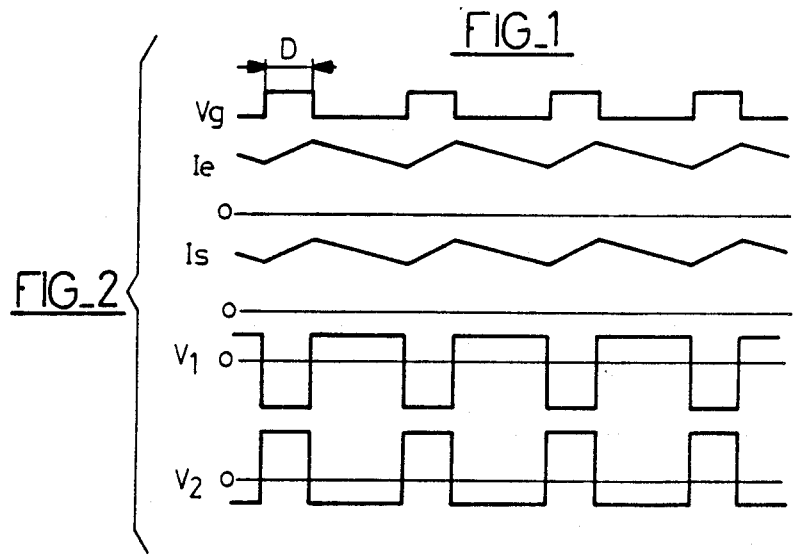
FIG_2
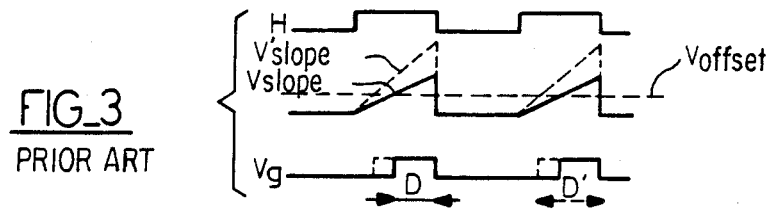
FIG_3 PRIOR ART
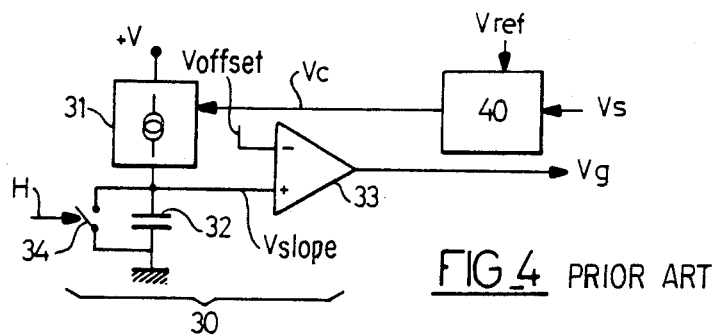
FIG_4 PRIOR ART

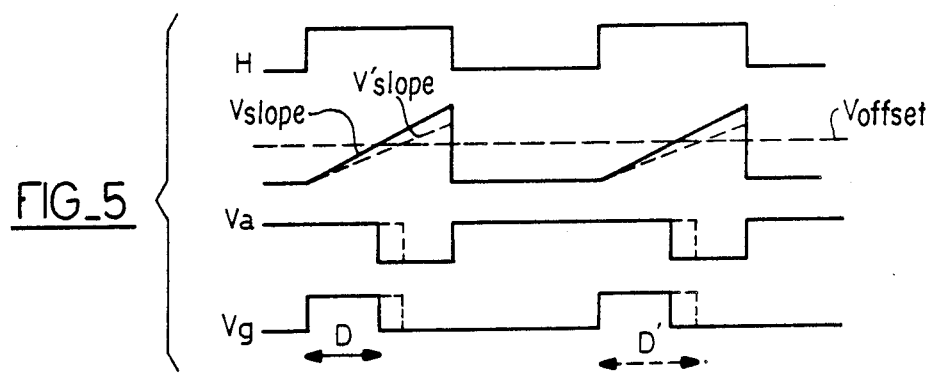
FIG_5
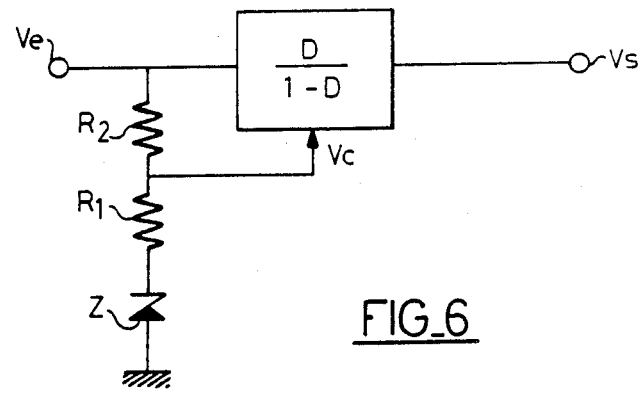
FIG_6
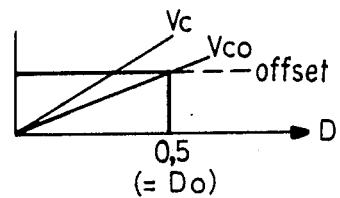
FIG_7

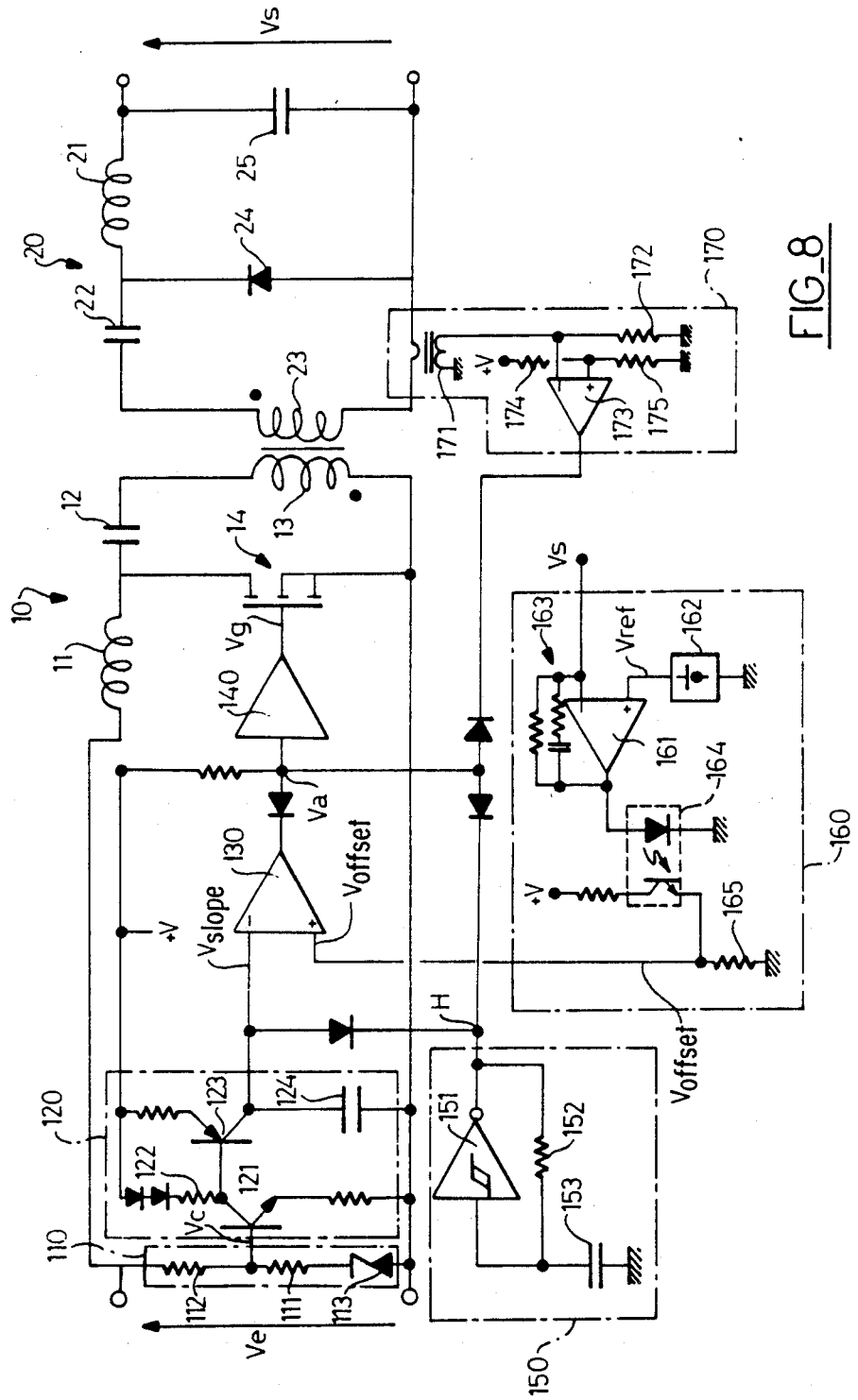
FIG_8

CUK TYPE DIRECT/DIRECT VOLTAGE CONVERTER AND MAINS SUPPLY WITH DIRECT CONVERSION ACHIEVED WITH A CONVERTER SUCH AS THIS

BACKGROUND OF THE INVENTION

1. Field of the Invention

The present invention concerns so-called "Cuk" type direct/direct or d.c./d.c. voltage converters.

2. Description of the Prior Art

The general diagram of converters of this type is illustrated in FIG. 1.

On the primary side 10 a first circuit comprising, in series, an inductance coil 11, a capacitor 12 and a transformer primary winding 13 which receives, at its terminals, the voltage $V_e$. The capacitor 12 and the winding 13 can be short-circuited periodically under the control of a control circuit 30 which controls an active switchover element 14 such as a transistor (generally a power MOS transistor).

On the secondary 20 side, there is a similar circuit, comprising a second series circuit with an inductance coil 21, a capacitor 22 and the secondary winding 23 of the transformer, a circuit wherein the capacitor 22 and the winding 23 can be short-circuited by a passive switch-over device, generally a diode 24 mounted as a recovery diode.

It will be noted that the windings 13 and 23 of the transformer may be virtual windings if a turns ratio of 1:1 is desired, and that there is no need for galvanic insulation. It suffices then to replace the windings with two crossed wires connecting the primary and secondary, or two non-crossed wires, thus giving, at the output, a voltage $-V_s$ which, however, makes it possible to combine the two capacitors 12 and 22 in one and the same capacitor.

Although, hereinafter, we shall consider the transformer and its windings, the present invention is not restricted to Cuk converters that effectively include a transformer but can also be applied to Cuk converters wherein the windings are virtual, all other things being equal.

A Cuk converter generally works as follows: when the transistor 14 is conductive, the input voltage $V_e$ is applied to the terminals of the inductance coil 11. This has the effect of charging this inductance coil. At the same time, this transistor in conduction connects the capacitor 12 to the terminals of the winding 13, the effect of which is to apply a negative voltage to the terminals of the transformer (the capacitor had been loaded at a voltage $-V_e$ during the preceding cycle). Simultaneously, at the secondary winding 23 of the transformer, there will be a voltage $V_2$ proportionate to the voltage $V_1$ applied to the primary winding 14 (or equal, if the turns ratio is 1:1), but with the it is enough to provide for low value capacitors 15 and 25 at the input and output to eliminate this single residual component.

On the contrary, in direct/direct or d.c./d.c. converters working by other principles (notably chopping systems, such as so-called fly-back or forward converters) the chopping of the input current produces a very strong ripple at both the input and output and, therefore, a high degree of interference on both the input lines and the output lines, so that it is necessary to provide for capacitors which are reservoirs of very high capacitance, as well as ballast inductance coils to prevent the lines from being excessively disturbed upline and downline whereas, on the contrary, the Cuk converter is essentially a converter without filtration.

Secondly, it is observed that the transformer always works in an a.c. mode, without any d.c. component since there is always a capacitor in series with the winding 13 (i.e. the mean voltage is zero). Thus, since the quiescent point will correspond to a null voltage, it is possible to have a very high voltage excursion before saturating the transformer so that even with a very small-sized transformer, it is always possible to be take position below this saturation limit.

Besides, the fact that, in the same way, there is an opposite sign, for the two windings of the transformer are coiled in opposite directions. The recovery diode 24 will thus get biased in the direction in which it is conductive so that the voltage $-V_2$ will load the capacitor 22.

When the transistor 14 is no longer conductive, i.e. when the control circuit 30 puts an end to the pulse $V_g$ which ensured the conduction, the inductance coil 11 will get discharged in the capacitor 12 which will then get carried, between its terminals, to the voltage $V_e$. On the secondary side, owing to the reversal of polarity, the diode 24 will get biased in the "off" direction, so that the capacitor 22 will get discharged in the inductance coil 21. At the secondary, winding 23 there will thus be an addition of the discharge currents of the two capacitors, one directly and the other through the transformer.

FIG. 2 shows the shape of the different signals obtained at the pace of the control pulses $V_g$ delivered by the control circuit 30 (a pulse with a duration D corresponding to the conduction state of the transistor 14).

This type of conductor has two typical advantages.

Firstly, the input and output currents, respectively marked $I_e$ and $I_s$, have low residual ripple: this property which is inherent to the working of the converter, is obtained even when there is no filtering at all, so that alternating signal at the secondary winding 23 enables current transformers to be placed in series with the secondary winding to measure the output current, thus avoiding recourse to shunts which, in principle, produce voltage drops that increase the internal impedance of the converter.

By contrast, the Cuk type converters have the disadvantage wherein the value of the output voltage is not proportionate, as in the chopping converters, to the width of the control pulses (namely, given by a simple expression of the form ($V_s = k \cdot D \cdot V_e$) but are given by a non-linear expression of the following form (assuming a turns ratio of 1:1):

$$V_s = V_e \cdot [D/(1-D)]$$

D being the duration or "width" of the pulse $V_g$ (expressed in terms of cyclical ratio) corresponding to the period for which the transistor 14 is put into conduction.

Besides, it is necessary to provide for a regulation of the converter so that it is possible, in controlling the delivery of the pulses in the control circuit 30, to vary the output voltage $V_s$ so as to compensate, firstly, for the variations in the output load and, secondly, for the variations in the input voltage.

Up to now, this was achieved by a regulation loop 40 (FIG. 1) receiving at the input the output voltage $V_s$ and modifying a control voltage $V_c$ of the control circuit 30 as a function of the deviation measured between this output voltage $V_s$ and a set voltage with a given reference.

The general diagram of the prior art regulation circuits and the different signals delivered are given in FIGS. 3 and 4.

A regulation loop 40 receives, firstly, the output voltage $V_s$ measured and, secondly, a reference voltage $V_{ref}$ and delivers, at output, a control signal $V_c$ enabling the monitoring of a slope generator formed by a current generator 31 charging a capacitor 32. The slope voltage $V_{slope}$ obtained is shown in FIG. 3, where it can be seen that the start of the slope is synchronized with each clock pulse H, which also determines the end of the slope. The gradient of the slope will vary as a function of the error signal $V_c$ and a comparator 33 will be used to compare the instantaneous voltage $V_{slope}$ of the slope with a fixed offset voltage $V_{offset}$. The output signal of this comparator 33 will form the control pulse $V_g$ enabling the transistor 14 to be placed in the conductive state. It is seen that the start of the control pulse $V_g$ is determined by the instant, which is variable, when the voltage $V_{slope}$ reaches the level $V_{offset}$ while the end of the control pulse $V_g$ still corresponds to the end of the clock pulse H, namely, the instant when a change-over switch 34, controlled by the clock signal, resets the voltage at the terminals of the capacitor 32.

The result of this is that if the output voltage $V_s$ decreases (either because of an increase in the load or because of a decrease in the input voltage $V_e$), the gradient of the slope will get rectified, taking the shape indicated by $V'_{slope}$ and therefore extending concommitantly with the duration of the pulse from D to D', the effect of which will be to raise the output voltage and thus compensate for the detected voltage drop.

It is seen, however, that with this prior art control and regulation circuit, it becomes inevitably necessary to find a compromise between:
firstly, the precision of regulation which will be all the greater as the gain of the regulation loop 40 is high and,
secondly, the need to avoid the instabilities of the system, which is a closed loop regulation system and, hence, one that is stable only under certain conditions. This makes it necessary to provide for a sufficient gain or phase margin and, therefore, makes it necessary to reduce the precision and extend the time constant of the regulation.

In practice, it is common to use stabilization networks, placed in the loop, which reduce the passband of the system in order to prevent instabilities. However, correlatively, these networks reduce, to the same extent, the response time of the converter to a variation of the input voltage $V_e$.

Now, in practice, it is seen that the load variations are most often relatively low (when the converters supply a set of electronic boards or analog circuits) while the biggest variations are those of the input voltage $V_e$, which may be due to an unstable mains (a converter supplied by the mains), peaks or sudden drops of voltage caused by the upline starting up of a high power consuming apparatus, etc.

It is observed that, when there are highly unstable supply sources such as of this type (a frequent case with respect to instruments taken on board aircraft and carried far from their energy source etc.), a peak or sudden collapse of voltage at an input will always be recovered (albeit in attenuated form) at the output because of the incapacity of the regulation circuit to take very short term variations into account, since it is necessary to provide for a minimum time constant of the loop to ensure the stability of the system.

One of the aims of the present invention is to overcome these various drawbacks in proposing a regulation and control system which, without compromising on stability, makes it possible to have a very short response time which is far shorter than the clock period.

SUMMARY OF THE INVENTION

To this effect, the present invention proposes a control and regulation system for Cuk converters working in open loop mode (hence always stable irrespective of the working conditions), namely a system wherein the control voltage $V_c$ is made independent of the input voltage $V_e$.

Since, as indicated further above, the major variations are those of the input voltage, these variations will have no effect on the control voltage $V_c$, so that the gain of the regulation loop can be reduced (and hence, its passband can be widened) for there will be no longer any need to compensate for anything except for variations in load in order to be able to determine the control voltage.

To this effect, in a manner characteristic of the invention:
the gradient of each slope varies as a function of the input voltage and is independent of the output voltage;
the threshold level is a function of the error signal and,
the control pulses are produced between a fixed instant corresponding to the start of each slope and a variable instant corresponding to the flip-over of the comparator circuit.

Very advantageously, the variation in the gradient of the slope generator is controlled by a control voltage tapped at the mid-point of a divider bridge, the divider bridge being series-mounted with a voltage reference and the divider bridge/voltage reference set being carried to a voltage equal to or proportionate to the input voltage, and the values of elements of the divider bridge and of the reference voltage being chosen so that the output voltage produced by the converter under the control of the control circuit is made essentially independent of the input voltage.

The present invention can also be applied, very advantageously, to the making of a direct conversion mains supply comprising a voltage converter of the above-mentioned type, directly receiving, at input, the mains voltage, the frequency of repetition of the control pulses of the control circuit being notably greater than the mains frequency.

BRIEF DESCRIPTION OF THE DRAWINGS

Other features and advantages of the invention will appear from the following detailed description, made with reference to the appended drawings, of which:
FIG. 1 mentioned above, shows the principle of a Cuk converter to which the present invention can be applied;
FIG. 2, also mentioned above, shows various signals produced by the converter of FIG. 1;
FIG. 3, also mentioned above, shows the control signals proposed up to now to guide the converter of FIG. 1.

FIG. 4, also mentioned above, shows a prior art circuit used to generate the signals of FIG. 3;

FIG. 5 is homologous to FIG. 3, for a control achieved according to the teachings of the invention;

FIG. 6 shows the circuit enabling the shunting of the control voltage $V_c$, from the input voltage, independently of the output voltage;

FIG. 7 shows the variation in gradient as a function of the pulse duration and,

FIG. 8 shows an embodiment of a Cuk converter controlled by a control and regulation circuit according to the present invention.

DESCRIPTION OF PREFERRED EMBODIMENTS

FIG. 5 gives a schematic view of the control circuits which make it possible, characteristically according to the present invention, to control the Cuk converter by a control voltage which is independent of the output voltage.

To this effect, unlike in the prior art shown in FIG. 3, the pulse $V_g$ is made to start at a fixed instant, corresponding to the start of the clock signal H, and it is stopped at a variable instant which is a function of the instant, which is also variable, at which the instantaneous level of the slope voltage $V_{slope}$ reaches the level of a offset voltage $V_{offset}$.

If D is the duration between the start of the slope and the crossing of the threshold, it is noted that D is inversely proportionate to the control voltage of the slope (this is also different from the prior art): for, if for example, the voltage gets reduced, the pulse duration has to be extended and hence, it is necessary to provide for a slope voltage $V'_{slope}$ which has a smaller gradient.

In a manner which is also characteristic of the present invention, it shall be seen to it that the control voltage depends only on the input voltage $V_e$ and is independent of the output voltage $V_s$.

This enables considerable reduction in the gain of the regulation loop which should no longer compensate for anything other than the variations in the output load which, as we have seen, are generally small and slow.

Provision could then be made for a very stable loop with low gain and high correction which will have effect only on the level of the offset voltage $V_{offset}$ (as a function of the signal voltage $V_s$ and a set voltage $V_{ref}$) while the variations of the input voltage which are very sharp and very sudden are entirely taken into account by the control circuit of the slope and therefore taken into account without any delay, all the more so as, if the generation of the slope is made independent of the output voltage $V_s$, the slope generator will be an open loop circuit and, hence, always stable.

The variations of the input voltage will produce a variation in the gradient of the slope which will result in a shortening or immediate extension of the pulse in progress without awaiting, as was the case with the prior art circuit, the following clock pulse. This makes it possible to eliminate all the very short variations of input voltage even if their duration is a few microseconds only, i.e. smaller than the clock period.

One of the difficulties with a regulation mode of this type, however, arises from the fact that, in Cuk converters, the output voltage is not proportionate to the pulse duration but has the form $V_e \cdot (D/(1-D))$ as indicated above.

A simple feed-forward type of control, as used for the other types of converters where the output voltage is proportionate to the pulse duration, therefore cannot be transposed to the case of the Cuk converter for which there is a non-linear function, where neither the rate of increase of $V_s$ as a function of D nor the reverse of this rate are constant: this excludes any regulation by direct application of a control voltage directly linked to the input voltage.

To resolve this problem, the invention proposes the generation of the control voltage $V_c$ by means of the circuit shown schematically in FIG. 6, i.e. comprising a divider bridge $R_2$, $R_1$ in series with a voltage reference Z (for example a Zener diode). The set $R_2$, $R_1$ and Z receives the input voltage $V_e$ at its terminals, and the control voltage is picked up between $R_2$ and $R_1$.

We shall now show how this circuit can be used to obtain an output voltage independent of the input voltage.

For convenience'sake, we shall take a mean value with a pulse duration $D_o$ of 0.5 clock periods for example (this value of $D_o$ is advantageous because it corresponds to a ratio $D/(1-D) = 1$, that is, an output voltage equal to the input voltage). In any case, we shall avoid taking values of D greater than 0.5 to prevent any instability of the system or operation in saturation zones. In practice, a value of between 0 and 0.5 is generally chosen for $D_o$.

If, at this value $D_o = 0.5$, there is a corresponding control voltage $V_c = V_{co}$ (taken, for convenience' sake, according to the circuits to be computed, for example $V_{co} = 10$ V) the value of D shall be given, in the general case (FIG. 7) by:

$$-D = D_o \cdot (V_{co}/V_c)$$

If we consider the circuit of FIG. 6, the voltage $V_c$ at the terminals of $R_1$ and Z is given, as a function of the voltage $V_e$, at the terminals of R2, R1 and Z by:

$$V_c = (V_e \cdot R1 + V_z \cdot R2)/R1 + R2) \quad (2)$$

If we replace $V_c$ by this expression in the previous expression giving D, we get:

$$V_s = [V_e D_o V_{co}(R1 + R2)]/[V_e R1 + V_z R2 - D_o V_{co}(R1 = R2)] \quad (3)$$

In practice, since $D_o$ and $V_{co}$ are given beforehand as indicated above, it is possible to choose the relative values of $R_1$, $R_2$ and $V_z$ so that we have:

$$V_z R2 = D_o V_{co}(R1 + R2) \quad (4)$$

Generally, we keep to $V_z$ giving a relationship between $R_1$ and $R_2$ which is easy to adjust, for example, by means of an tunable resistor.

We then get:

$$V_s = [D_o V_{co}(R1 + R2)]/R1 = \text{constant} \quad (5)$$

It is noted that the output voltage $V_s$ has become independent of the input voltage.

According to the relationships (4) and (5), it is possible to deduce all the magnitudes defining the circuit by fixing Z, $D_o$, $V_{co}$, $V_s$ etc. at the outset.

FIG. 8 gives an example of a Cuk converter controlled by a circuit applying the teachings that have just been explained.

In these figures, the numerical references identical to those of FIG. 1 designate elements similar to those of FIG. 1 (essentially the basic elements of a Cuk type converter) which will therefore not be described in detail again.

The controlling circuit of the present invention is formed by the different circuit elements marked 110 to 170.

The circuit 110 is the circuit, shown separately in FIG. 6, which is used to shunt the control voltage according to the desired non-linear variation relationship, the values of the resistor R1 111, the resistor R2 112 and the voltage reference (Zener) 113 having been chosen and adjusted, if necessary, to make at least an approximate check of the above relationship (4).

The control voltage $V_c$, taken at the mid-point of the resistors 111 and 112, for which the variation as a function of the input voltage $V_e$ is given by the above relationship (2), is applied to a current generator circuit 120 including a first NPN transistor 121 mounted on a common collector with a collector resistor 122, enabling it to work as a current generator, the collector current being proportionate to the voltage $V_c$ applied to the base of this transistor.

To enable the load of a capacitor to be controlled with this constant current, the capacitor 124 is driven by a PNP type transistor 123 mounted as an inverter, so that the load current of the capacitor 124, mounted in its collector circuit, will be proportionate to the base voltage of the transistor 123, which is itself proportionate to the collector current of the upline transistor 121.

The load voltage of the capacitor 124, which forms the slope voltage $V_{slope}$ shown in FIG. 5, is applied to the inverter input of an operational amplifier 130 working as a comparator, the direct input of which receives the offset voltage $V_{offset}$.

The output signal of this comparator drives a buffer stage used to control the transistor 14, which is advantageously a power MOS transistor, by the signal $V_g$ shown in FIG. 5, namely by the control pulses with a variable width D.

A multivibrator 150, comprising an inverter 151 with a resistor 152/capacitor 153 network enabling it to be made to oscillate at a frequency of the order of 100 kHz with a cyclical ratio of 1:1 (signal H of FIG. 5) makes it possible, firstly, to periodically discharge the capacitor 124 and, secondly, to lock the control of the transistor 14 by applying the clock signal to the input of the buffer stage 140 ($V_a$ illustrated in FIG. 5).

The offset voltage $V_{offset}$ is produced by a differential amplifier 161 comparing the output voltage $V_s$ to a set voltage $V_{ref}$ produced by a voltage reference 162. This differential amplifier 161 has a stabilization network 163 for which it is possible to provide for a relatively wide margin of gain or phase because there will no need for a high gain for the amplifier 161, the feedback being done exclusively on the error voltage and, hence, on the load variations which are usually small and slow, as explained above.

The output signal of the differential amplifier 161 is transmitted to the comparator 130 through a photo-coupler 164 providing for galvanic insulation between the primary and secondary of the converter, the offset voltage $V_{offset}$ being taken at the terminals of a load resistor 165 in series with the output of the photo-coupler.

The converter thus made proves to be particularly efficient.

Thus, for variations in input voltage between 50 and 100 V, variations in output voltage of only some millivolts have been observed, i.e. with a stability which is better than 1%.

The measured response time, smaller than 5 $\mu$s, was substantially smaller than the chopping period, thus making it possible to take into account extremely short variations in the input voltage.

Various modifications can been made to the circuit of FIG. 8.

In particular, it is possible to provide for a symmetrical supply at the output, with two windings mounted in opposition at the secondary of the transformer, each winding being provided with the components 21 to 25 mounted symmetrically.

It is also possible to provide for a circuit 170 for protection against excess currents using a current transformer 171 (a shunt is not necessary since the mean output voltage is zero, and since there is therefore no d.c. component), the secondary side of this transformer supplying a resistor 172, the voltage at the terminals of which is compared with a fixed reference voltage by means of a comparator 173. The fixed reference voltage is determined as a function of the maximum intensity that the circuit should bear, for example by means of a divider bridge 174, 175.

Should the current at the secondary side of the converter go beyond the threshold that has been set, the comparator 173 flips over and then applies a pulse to the input of the buffer stage 140. This pulse neutralizes the effect of the control circuit. It will be noted that the effect of this protection circuit is instantaneous and that it can act even when a control pulse is being delivered.

Besides, the system of the present invention can be applied very advantageously to the making of main supplies called "transformerless supplies" (namely supplies without any transformer working at the mains frequency): the converter is then directly supplied at the input by the mains voltage $V_e$ which will vary at the rate of this mains frequency. Since, as we have seen, the variations in input voltage have practically no effect on the output voltage, there will be obtained (provided, of course, that the chosen clock frequency, of the control circuit, is far greater than the mains frequency), a voltage at the secondary side $V_s$ that has only a small ripple, even when there is no filtering capacitor. This is due to the almost instantaneous response of the control circuit to the variations of the input voltage since, characteristically according to the invention, the input voltage, as a set value, has been eliminated from the feedback loop.

It is seen that, in thus directly supplying the converter from the mains, it is possible to use only a filtering capacitor 25, with low capacitance, at the secondary side (this capacitor now only has to filter the residual ripple) this low capacitance being typically three to five times less than in a standard main supply, and to get rid of the need for any input filter.

What is claimed is:

1. A Cuk type direct/direct or DC/DC voltage converter, comprising;
   a primary side comprising;
   a first series circuit comprised of a first inductance coil, a first capacitor and a first winding, wherein said first series circuit receives at an input an input DC voltage; and
   an active switch-over element which enables said first series circuit to be short-circuited;
   a secondary side comprising;
   a second series circuit comprised of a second inductance coil, a second capacitor and a second winding, wherein said second series circuit delivers at an output an output DC voltage; and
   a passive switch-over device which enables said second series circuit to be short-circuited;

a pulse generating circuit for producing control pulses, said control pulses having a variable width which is a function of an error signal, wherein said error signal is a function of a difference between a measured output DC voltage and a set output voltage;

a control circuit which receives said control pulses and controls said active switch-over element, said control circuit comprising;

a periodic slopes generator; and a comparator circuit for comparing the instantaneous level of the slopes given by the slope generator with a threshold level as a function of the error signal;

wherein:

a gradient of the slopes varies as a function of the input voltage and is independent of the output voltage;

the threshold level is a function of the error signal; and the control pulses are produced between a fixed instant corresponding to the start of each slope and a variable instant corresponding to the flip-over of the comparator circuit.

2. The converter of claim 1, wherein the variation in gradient of the slopes generator is controlled by a control voltage tapped at a mid point of a divider bridge, the divider bridge being series-mounted with a voltage reference forming a divider bridge/voltage reference set which has applied thereto a voltage equal to or proportionate to the input voltage.

3. The converter of claim 2, wherein the values of the elements of the divider bridge and of the voltage reference are chosen so that the output voltage produced by the converter under the control of the control circuit is made essentially independent of the input voltage.

4. The converter of claim 1, wherein a mains voltage is applied as the input DC voltage and the frequency of repetition of the control pulses of the control circuit are notably greater in frequency than the frequency of the mains supply.

* * * * *